United States Patent [19]
Pfenninger et al.

[11] Patent Number: 4,750,441
[45] Date of Patent: Jun. 14, 1988

[54] FURROW OPENING ASSEMBLY

[75] Inventors: Billy J. Pfenninger; David H. Weast, both of Hutchinson, Kans.

[73] Assignee: Krause Plow Corporation, Hutchinson, Kans.

[21] Appl. No.: 768,159

[22] Filed: Aug. 22, 1985

[51] Int. Cl.⁴ .............................................. A01C 5/00
[52] U.S. Cl. .......................................... 111/85; 111/88
[58] Field of Search ................... 111/52, 61, 62, 85, 111/73, 77; 172/145, 151, 149, 148

[56] References Cited

U.S. PATENT DOCUMENTS

| | | | |
|---|---|---|---|
| 1,348,862 | 8/1920 | Genung | 111/60 |
| 2,691,353 | 10/1954 | Secondo | 111/73 X |
| 2,771,044 | 11/1956 | Patifer | 111/85 |
| 2,981,213 | 4/1961 | O'Neil | 111/64 |
| 3,076,511 | 2/1963 | Johnson | 111/85 X |
| 3,077,290 | 2/1963 | Rehder | 111/77 |
| 3,880,100 | 4/1975 | Gillies | 111/85 |
| 4,135,457 | 1/1979 | Willis | 111/52 |
| 4,148,266 | 4/1979 | Weitz | 111/52 |
| 4,333,534 | 6/1982 | Swanson | 172/464 |

Primary Examiner—Richard J. Johnson
Attorney, Agent, or Firm—Hovey, Williams, Timmons & Collins

[57] ABSTRACT

A towable, furrow opening assembly has an intermediate opener and delivery tubes for deposit of materials such as seed into the opened furrow, together with a trailing press wheel and an aligned, leading wheel such that furrow depth is controlled by the wheels whose corresponding, articulated frames are looped over the opener. Buckling of the frames at the will of the operator varies the depth of the furrow.

14 Claims, 2 Drawing Sheets

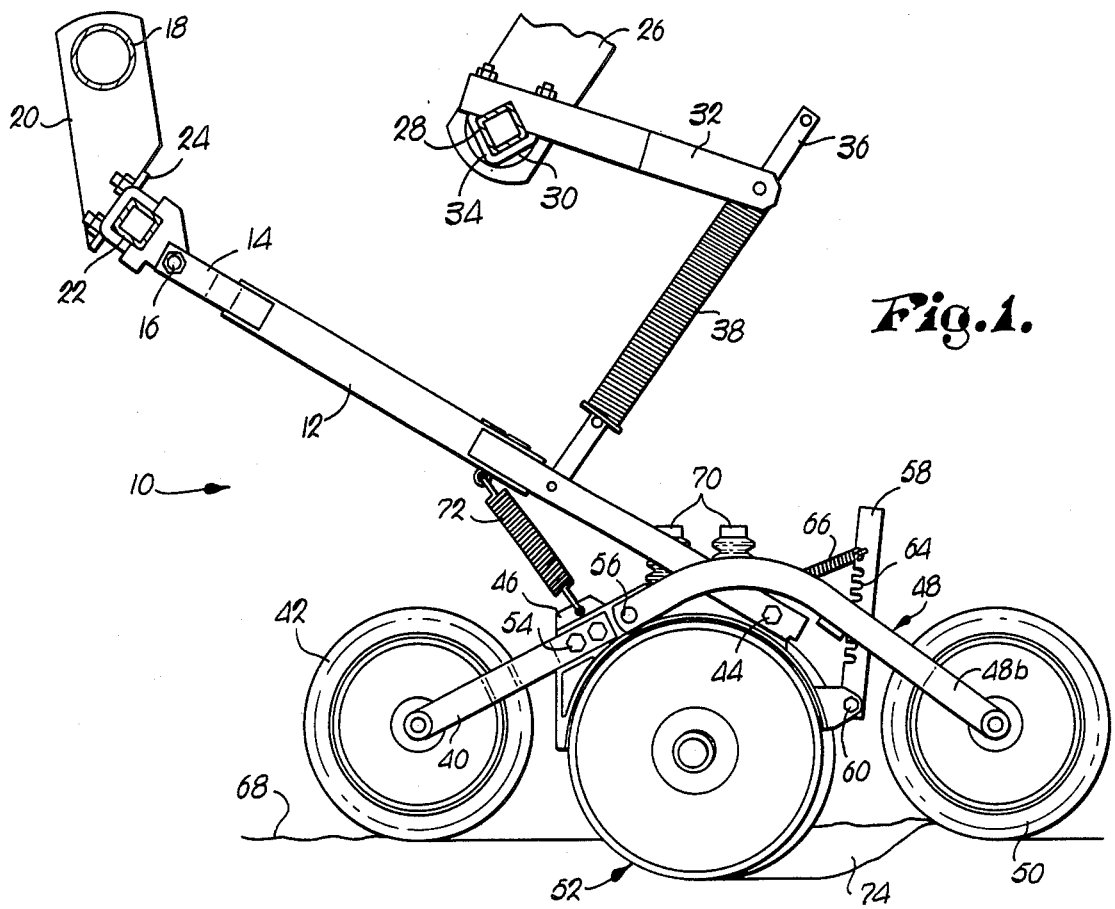
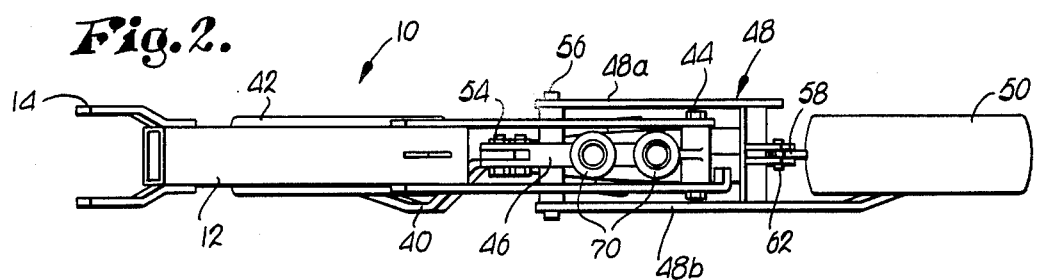
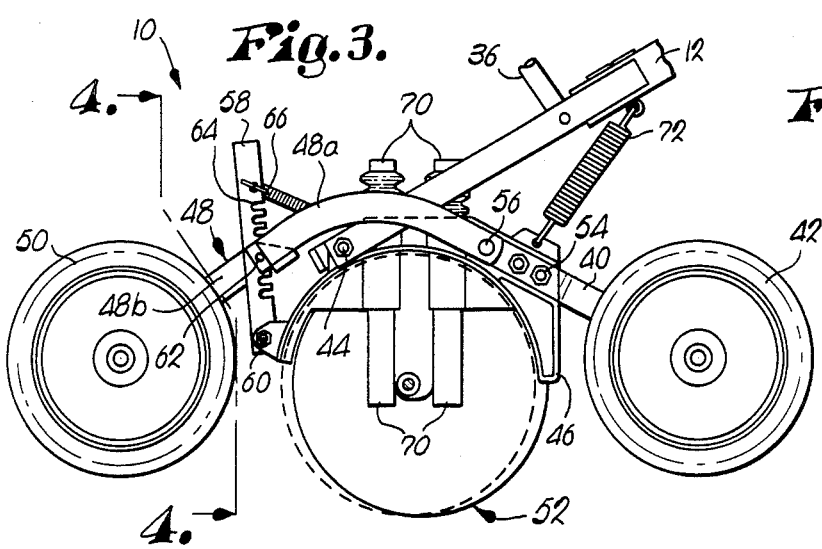
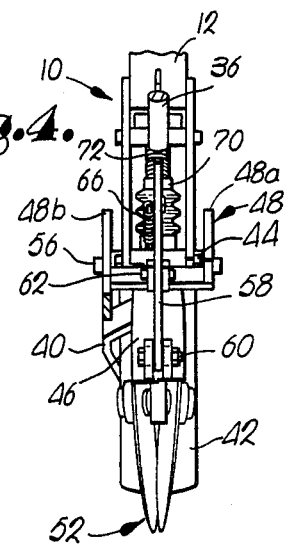

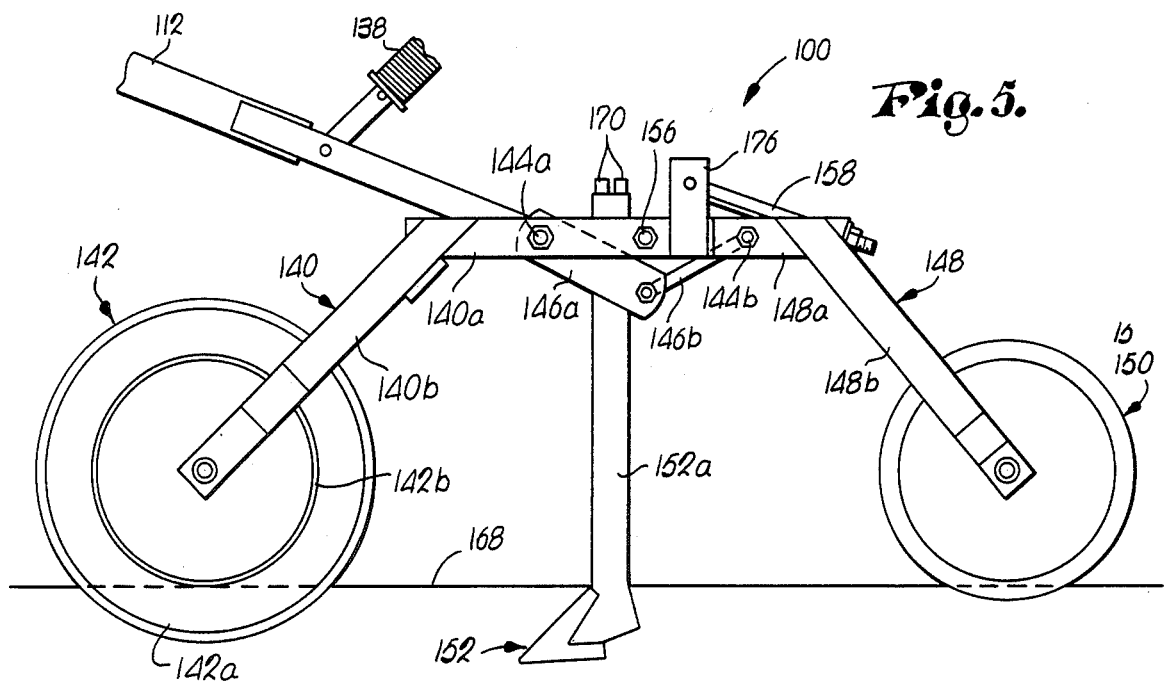
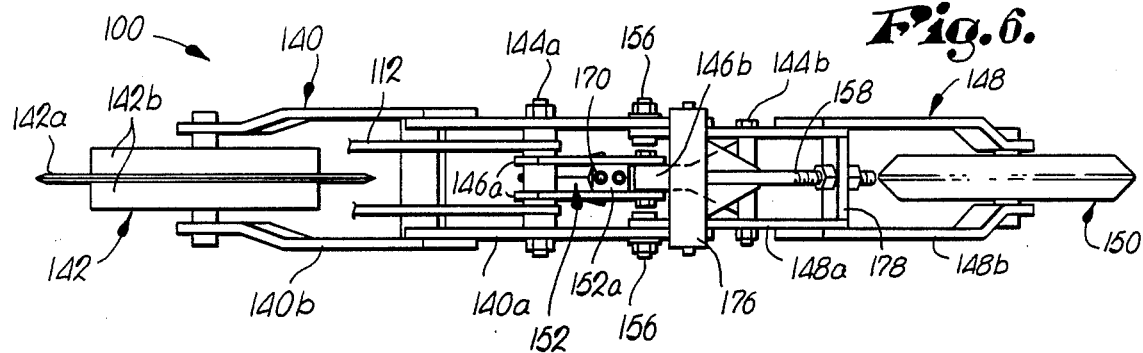
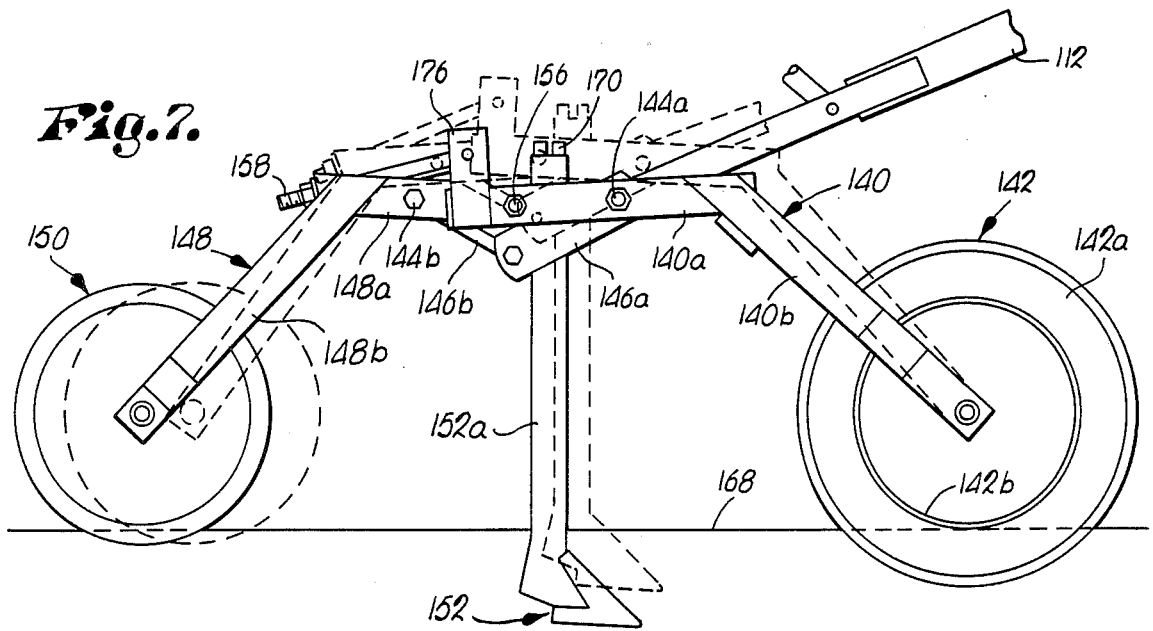

FURROW OPENING ASSEMBLY

BACKGROUND OF THE INVENTION

1. Field of the Invention

The present invention relates to farm implements used for row seeding by forming spaced furrows of preselected depths, depositing seed and fertilizer into the furrows, pressing dirt falling into the furrows onto the deposited materials with the furrow openers each supported by front and rear wheels which determine the depth of the furrows.

Present day drills and row seeders generally, for use in large scale farming operations, must be capable of accurately and speedily laying down seed in a multiplicity of spaced, parallel furrows of uniform depths during each pass through the field. And, desirably, the implement should also be capable, at the same time, of feeding fertilizer in granular form into the furrows. Moreover, the depth of the furrows must be easily and quickly varied at the will of the operator.

2. Summary of the Present Invention

To accomplish such requirements, our instant invention provides a series of identical, independent, side-by-side units or assemblies, each placed in tow by a pivotal connection to the overhead superstructure or framework of the implement, all in association with suitable implement mechanisms for raising the assemblies to a non-operating, over-the-road position.

Each assembly has a front and a rear wheel supporting a furrower opener therebetween, with the wheels operating a gauge the depth of the furrow. The frames or beams of the wheels, looped over the opener are articulated above the latter such as to vary the furrow depth by buckling of such beams and thereby moving the wheels toward and away from each other. A manual control is used to effect the buckling, and the wheels as well as the opener are yieldably biased downwardly. The rear wheel serves as a press wheel in the furrow above the seed and the front wheel may be of such nature as to slice the ground ahead of the opener.

IN THE DRAWINGS

FIG. 1 is an elevational view showing one side of a furrow opening assembly made according to a first embodiment of our present invention;

FIG. 2 is an essentially top plan view thereof with parts above the tongue or tow bar removed;

FIG. 3 is a fragmentary view similar to FIG. 1 showing the opposite side of the assembly;

FIG. 4 is a cross-sectional view taken on line 4—4 of FIG. 3;

FIG. 5 is a view similar to FIG. 1 showing a second embodiment of the instant invention;

FIG. 6 is a view similar to FIG. 2 showing the assembly of FIG. 5; and

FIG. 7 is a view similar to FIG. 3 illustrating the assembly of FIGS. 5 and 6.

Related hereto is a co-pending U.S. application Ser. No. 06/749,827, filed June 28, 1985, entitled "Foldable Drill".

DESCRIPTION OF THE PREFERRED EMBODIMENTS

It is to be contemplated that each of the furrow opening assemblies of FIGS. 1–4 and FIGS. 5–7 is to be used with drills, seeders, planters or comparable farm implements provided with overlying frames (not shown) from which such assemblies are to be suspended. Each implement will be equipped with a series of laterally spaced assemblies, each adapted to accommodate one row of seeds with the rows in substantial parallelism.

First Embodiment

Accordingly, with reference to FIGS. 1–4, an assembly 10 is provided with a tongue 12 having a leading coupling 14 adapted for pivotal attachment to the overlying implement frame through use of a pivot pin 16, the tongue 12 extending downwardly and rearwardly from the coupling 14. The implement frame carries an upper, front, torque tube 18 extending across the path of travel of the implement, and a plurality of spaced, front hangers 20 are rigidly connected to the tube 18 in depending relationship thereto. An elongated, front frame piece 22 parallel with the tube 18 is secured to the hangers 20 by front clamps 24 each of which, in turn, receives a pin 16.

The implement frame has a series of rear hangers 26 rigid thereto, which support an elongated, rear frame piece 28, also parallel with the tube 18. The hangers 26 having bearings 30 which permit rotation of the frame piece 28 about its longitudinal axis. An arm 32, corresponding to each tongue 12 respectively, extends rearwardly and downwardly from the frame piece 28 and is rigidly secured thereto by a rear clamp 34.

Mechanism (not shown) operably associated with the frame piece 28, releasably holds the latter against rotation and is employed to raise the assembly 10 (through a bar 36) for over-the-road travel. The bar 36 pivotally interconnects the arm 32 and the tongue 12 and has a spring 38 coiled thereabout for yieldably biasing the assembly 10 downwardly about the pin 16.

A front beam 40, provided with a leading, ground-engaging wheel 42, has a pivotal connection 44 with the tongue 12 (through a member 46) and a rear beam 48 is provided with a trailing, ground-engaging wheel 50. The beams 40 and 48 are looped over the member 46 and over a furrow opener 52 carried by the member 46 and disposed between the wheels 42 and 50.

The beam 40 is releasably mounted on the member 46 by fasteners 54 and the beam 48 has a pair of elements 48a and 48b, both articulated relative to the beam 40 by pivot means 56 passing through the member 46. The longer element 48b rotatably supports the wheel 50 behind the member 46, the latter of which may take the form of a single casting.

The casting of the opener 52 may be varied by structure between the beams for swinging the latter about the pivot 56. It includes a bar 58 having a pivotal joinder 60 with the member 46 and a pin 62 secured to the beam 48 and adapted for reception in a preselected one of a series of notches 64 in the bar 58. A spring 66 between the member 46 and the bar 58 yieldably biases the bar 58 toward the pin 62.

As best seen in FIG. 4, the opener 52 is in the nature of a pair of rotatable, concavo-convex discs which converge downwardly and forwardly toward a leading zone disposed downwardly and rearwardly of the wheel 42 at and just below ground level 68. The wheels 42 and 50 may be provided with rubber tires, as shown, and seed and fertilizer tubes 70 carried by the member 46, extend downwardly between the discs of the opener 52, discharging above the ground level 68. The tongue 12 is bifurcated at the rearmost, lowermost stretch thereof, receiving the tubes 70 therebetween. A coil spring 72 interconnects the member 46 and the tongue 12 beneath the latter. The wheels 42 and 50 are aligned fore and aft with the wheel 50 rolling within furrow 74 formed by the opener 52, i.e., onto the direct falling into the furrow 74 atop the seed and fertilizer.

Operation

As the assembly 10 is advanced, the wheel 42 rolls along the ground 68, cooperating with the wheel 50 in determining the depth of the furrow 74 cut by the opener 52. All the while, the spring 38 operates to bias the tongue 12 downwardly about the pin 16 to yieldably hold the wheels 42 and 50 as well as the opener 52 down in the positions shown in FIG. 1. Seed, fertilizer and dirt are pressed down by the wheel 50. When the bar 58 is pulled rearwardly against the action of the spring 66 the pin 62 may be relocated in a desired notch 64 to change the depth of the furrow 74. The tube 18 in combination with mechanism (not shown) resists upward swinging movement of the assembly 10. The spring 72 resists downward swinging movement of the member 46 relative to the tongue 12 when the wheels 42, 50 and the opener 52 are raised above the ground level 68.

Second Embodiment

In FIGS. 5–7 an assembly 100 has a tongue 112 biased by a spring 138 and all parts at an elevation higher than the latter may be the same as shown in FIGS. 1–4 above described. Here also is provided a front wheel 142, a rear wheel 150 and an intermediate furrow opener 152.

Still further, the wheel 142 supports a front beam 140 and the wheel 150 supports a rear beam 148 with the beams 140, 148 looped over the opener 152. The double-armed beam 140 has an essentially horizontal section 140a and an inclined section 14b rigid to and sloping downwardly and forwardly from the section 140a. Similarly, the double-armed section 148 has an essentially horizontal section 148a and an inclined section 148b rigid to and sloping downwardly and rearwardly from the section 148a.

The opener 152, in the nature of a hoe, is carried by a vertical shank 152a extending above and below the section 140a between the arms of the latter rearwardly of the tongue 112. Seed and fertilizer tubes 170 extend through the shank 152a to the hoe 152.

The metallic wheel 142 has a sharpened coulter 142a and a pair of ground-engaging bands 142b for limiting the depth of the coulter 142a below ground level 168. The metallic press wheel 150 is aligned fore and aft with the coulter 142a and with the leading point of the hoe 152.

The lowermost and rearmost end of the tongue 112 has a pivotal connection 144a with the section 140a in the nature of a front cross bolt which, in turn supports a pair of rearwardly extending links 146a which support the shank 152a. The section 148a has a rear cross bolt 144b receiving a rear link 146b pivotally connected to the links 146a therebetween.

The beams 140 and 148 are articulated by use of bolts 156 and depth adjustment is effected by use of a bolt 158. The section 140a has an upstanding, U-shaped element 176 which pivotally receives the forwardmost end of the bolt 158, and the section 148a is provided with a crosspiece 178 through which the bolt 158 passes.

Operation

As in the case of the assembly 10, the opener 152 is supported by the wheels 142 and 150 through their respective beams 140 and 148 pivotally interconnected at 156. However, in the assembly 100, the coulter 142a slices the earth or turf ahead of the hoe 152, limited in depth by the bands 142b.

With one adjustment of the bolt 158 the hoe 152 forms a relatively shallow furrow as depicted by dotted lines in FIG. 7. A second adjustment of the bolt 158 effects a deeper furrow as shown in FIG. 5. And a third adjustment lowers the hoe 152 still farther as illustrated by full lines in FIG. 7.

Noteworthy is the fact that lowering of the line of articulation at bolts 156 increases the distance between the wheels 142 and 148 causing the hoe to descend. Conversely, as the beams 140 and 148 tip downwardly, the hoe 142 rises and the wheels 142 and 150 move toward each other. The geometry, especially of the links 146a and 146b and of the bolt 158 in relation thereto is such as to maintain the shank 152a vertical through all its height variations.

We claim:

1. A furrow opening assembly for suspension from an implement frame, assembly comprising:
   a tongue having a leading coupling adapted for pivotal attachment to said frame so that the tongue extends downwardly and rearwardly from the frame when attached thereto;
   a front beam provided with a leading, ground-engaging wheel;
   connecting means for pivotally connecting said front beam with said tongue rearwardly of said coupling,
   said connecting means including a member rigidly secured to said front beam and having a transverse pivotal connection with the tongue adjacent the normally lower, rear end of the tongue;
   a rear beam provided with a trailing, ground-engaging wheel;
   a furrow opener carried by said member between said wheels;
   pivot means pivotally connecting the rear beam with said member for up and down swinging movement of the front and rear beams relative to one another about said pivot means; and
   selectively actuatable adjustment structure connected between the rear beam and said member for varying the depth of the opener by swinging the rear beam about said pivot means,
   said pivot means for the rear beam being spaced forwardly on the member from said pivot connection for the tongue so that the rear end of the tongue and the front end of the rear beam overlap one another in a fore-and-aft direction,
   said rear beam including a pair of horizontally spaced elements for the trailing wheel which are disposed out of the vertical plane of the tongue in clearing relationship therewith whereby to permit unobstructed vertical swinging movement of the rear beam during both depth adjustment of the opener and rocking of the furrow opening assembly as changes in ground contour are encountered.

2. The invention of claim 1, said opener being a pair of concavo-convex discs converging downwardly and forwardly thereof.

3. The invention of claim 2, said trailing wheel being disposed for rolling within the furrow opened by said opener.

4. The invention of claim 3, said leading wheel being in fore and aft alignment with said trailing wheel.

5. The invention of claim 4, said beams being looped over said opener.

6. The invention of claim 5; and resilient means adapted for disposition between the tongue and the frame for yieldably biasing the wheels and the opener downwardly.

7. The invention of claim 1, said adjustment structure including a bar having a pivotal joinder with said member and provided with a series of notches, said adjustment structure further having a pin secured to the rear beam for reception in a preselected one of said notches.

8. The invention of claim 7; and resilient means betwen the member and the bar yieldably biasing the latter toward said pin.

9. In a machine for depositing materials beneath the surface of the ground, the improvement comprising:
- a beam assembly having a front ground-engaging wheel at one end and a rear ground-engaging wheel at the opposite end;
- a pair of side-by-side, furrow-opening discs carried by beam assembly between said wheels for rotation a transverse, horizontal axes with respect to the direction of travel of the machine;
- towing means for said beam assembly including a mobile frame and a tongue extending downwardly and rearwardly from said frame;
- said tongue being pivotally coupled at its forward end with said frame for vertical swinging movement relative to the latter; and
- means pivotally connecting the rear end of said tongue with said beam assembly at a point above said axes of rotation of the discs whereby to permit said beam assembly to rock about said pivotal connection with the tongue and about the axes of rotation of the wheels in a manner to promote maintaining the discs at a constant depth of soil penetration as the beam assembly encounters changes in ground contour during advancement of the machine,
- said point of pivotal connection between the beam assembly and the tongue being located rearwardly of the axes of rotation of the discs.

10. In a machine as claimed in claim 9, wherein said frame is provided with spring means yieldably biasing the beam assembly toward the ground.

11. In a machine as claimed in claim 10, wherein said spring means is connected between the frame and said tongue.

12. In a machine as claimed in claim 11, wherein said tongue extends upwardly and forwardly from said point of pivotal connection of said tongue with said beam assembly, said spring means extending upwardly and rearwardly from said tongue for applying force downwardly and forwardly upon said tongue.

13. In a machine as claimed in claim 9, wherein said beam assembly includes a central mounting member to which said discs are attached, a front beam extending forwardly from said member and secured to the front wheel, and a rear beam extending rearwardly from said member and secured to the rear wheel, one of said beams being adjustably swingable relative to said member for adjusting the depth of penetration of the discs.

14. In a machine as claimed in claim 13, wherein said one beam is the rear beam.

* * * * *